United States Patent
Kawano et al.

(10) Patent No.: US 10,923,151 B2
(45) Date of Patent: *Feb. 16, 2021

(54) ILLUMINATION CONTROL DEVICE, ILLUMINATION CONTROL METHOD AND ILLUMINATION CONTROL PROGRAM

(71) Applicant: AlphaTheta Corporation, Yokohama (JP)

(72) Inventors: Hirokatsu Kawano, Yokohama (JP); Toshiki Nakai, Yokohama (JP); Junichiro Inoue, Yokohama (JP)

(73) Assignee: ALPHATHETA CORPORATION, Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/099,550

(22) PCT Filed: May 12, 2016

(86) PCT No.: PCT/JP2016/064094
§ 371 (c)(1),
(2) Date: Nov. 7, 2018

(87) PCT Pub. No.: WO2017/195310
PCT Pub. Date: Nov. 16, 2017

(65) Prior Publication Data
US 2019/0088285 A1    Mar. 21, 2019

(51) Int. Cl.
*G06F 17/00* (2019.01)
*G11B 20/10* (2006.01)
(Continued)

(52) U.S. Cl.
CPC .............. *G11B 20/10* (2013.01); *G10G 3/04* (2013.01); *G10H 1/40* (2013.01); *G11B 27/34* (2013.01);
(Continued)

(58) Field of Classification Search
CPC ........ G11B 20/10; G11B 27/34; H05B 37/02; H05B 37/0236; H05B 47/12; H05B 47/10;
(Continued)

(56) References Cited

U.S. PATENT DOCUMENTS 5,461,188 A * 10/1995 Drago ...................... A43B 3/00
                                                                    84/600
6,175,632 B1 * 1/2001 Marx ................... H04R 29/008
                                                                    381/56

(Continued)

FOREIGN PATENT DOCUMENTS

JP    H10-124078      5/1998
JP    2007-311155    11/2007
(Continued)

OTHER PUBLICATIONS

International Search Report, dated Aug. 16, 2016 (dated Aug. 16, 2016), 2 pages.

(Continued)

*Primary Examiner* — Joseph Saunders, Jr.
(74) *Attorney, Agent, or Firm* — Rankin, Hill & Clark LLP

(57) ABSTRACT

A device includes: an information acquisition unit configured to obtain music piece information containing at least information on a beat position in music piece data; a lighting control unit configured to control a lighting fixture with reference to a change point of a lighting effect, whose minimum unit is defined by the beat position; and an operation interlock control unit configured to apply, in response to an operation performed on a music piece reproduction apparatus configured to reproduce the music piece data or a music piece reproduction controller configured to control the music piece reproduction apparatus, the lighting (Continued)

Figure 1:
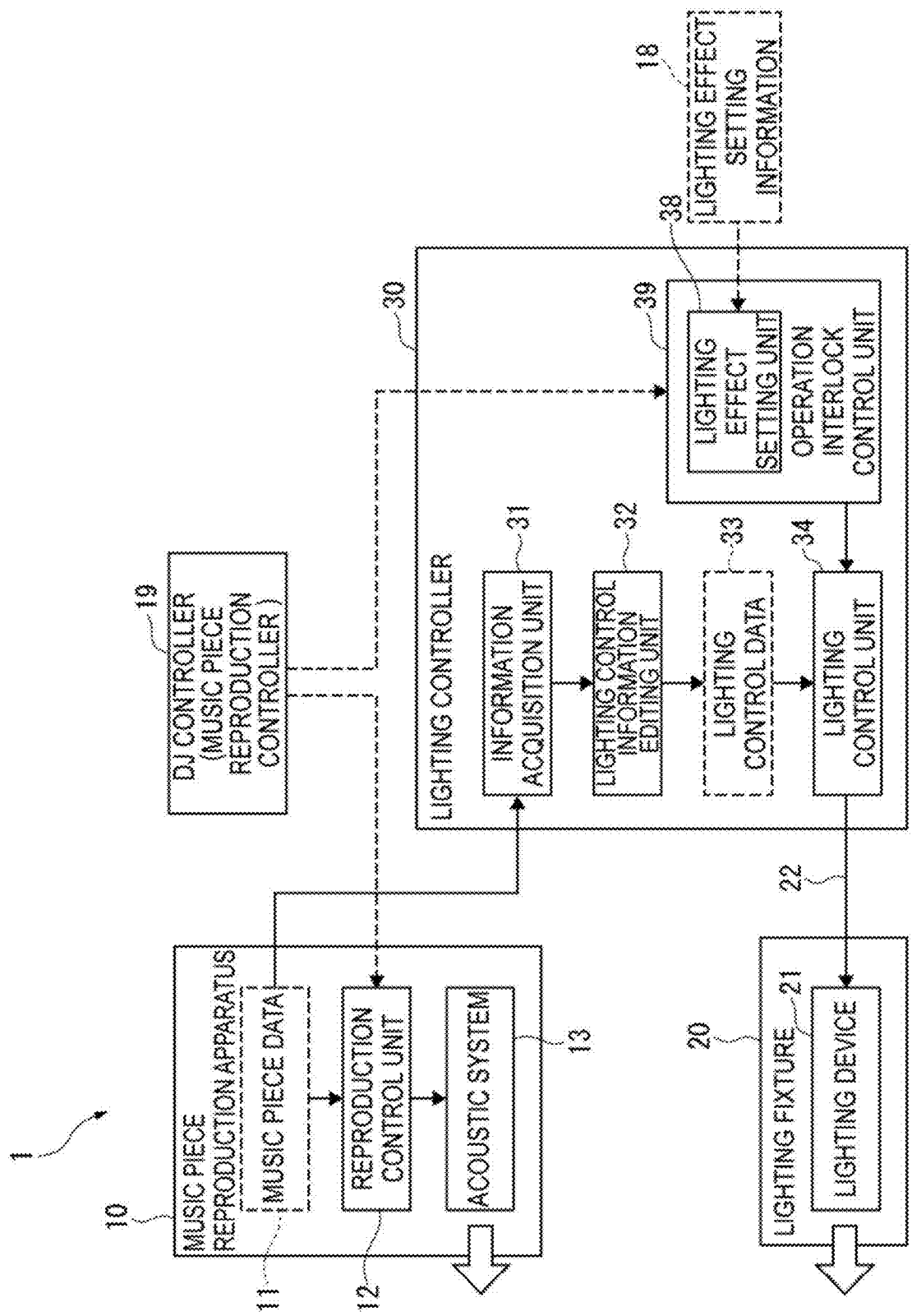

effect corresponding to the operation to the control of the lighting fixture.

14 Claims, 8 Drawing Sheets

(51) Int. Cl.
 *G11B 27/34* (2006.01)
 *H05B 47/10* (2020.01)
 *H05B 47/12* (2020.01)
 *G10G 3/04* (2006.01)
 *G10H 1/40* (2006.01)
 *G10H 1/00* (2006.01)

(52) U.S. Cl.
 CPC ............ *H05B 47/10* (2020.01); *H05B 47/12* (2020.01); *G10H 1/00* (2013.01); *G10H 1/0091* (2013.01); *G10H 2210/155* (2013.01); *G10H 2210/241* (2013.01); *G10H 2240/325* (2013.01)

(58) Field of Classification Search
 CPC .. G10G 3/04; G10H 1/40; G10H 1/00; G10H 1/0091; G10H 2210/155; G10H 2210/241; G10H 2240/325
 See application file for complete search history.

(56) References Cited

U.S. PATENT DOCUMENTS

| | | | | |
|---|---|---|---|---|
| 2002/0038157 | A1* | 3/2002 | Dowling | ............... A63J 17/00 700/90 |
| 2014/0297012 | A1* | 10/2014 | Kobayashi | ............ G06T 13/205 700/94 |

FOREIGN PATENT DOCUMENTS

| | | |
|---|---|---|
| JP | 2010-097084 | 4/2010 |
| JP | 2010-192155 | 9/2010 |
| JP | 2011-180311 | 9/2011 |
| JP | 2015-036710 | 2/2015 |
| WO | 2012/007990 A1 | 1/2012 |
| WO | 2015/092965 A1 | 6/2015 |

OTHER PUBLICATIONS

English translation of International Preliminary Report on Patentability dated Nov. 13, 2018 (dated Nov. 13, 2018), Application No. PCT/JP2016/064094, 8 pages.
European Search Report dated Oct. 14, 2019, 8 pages.

* cited by examiner

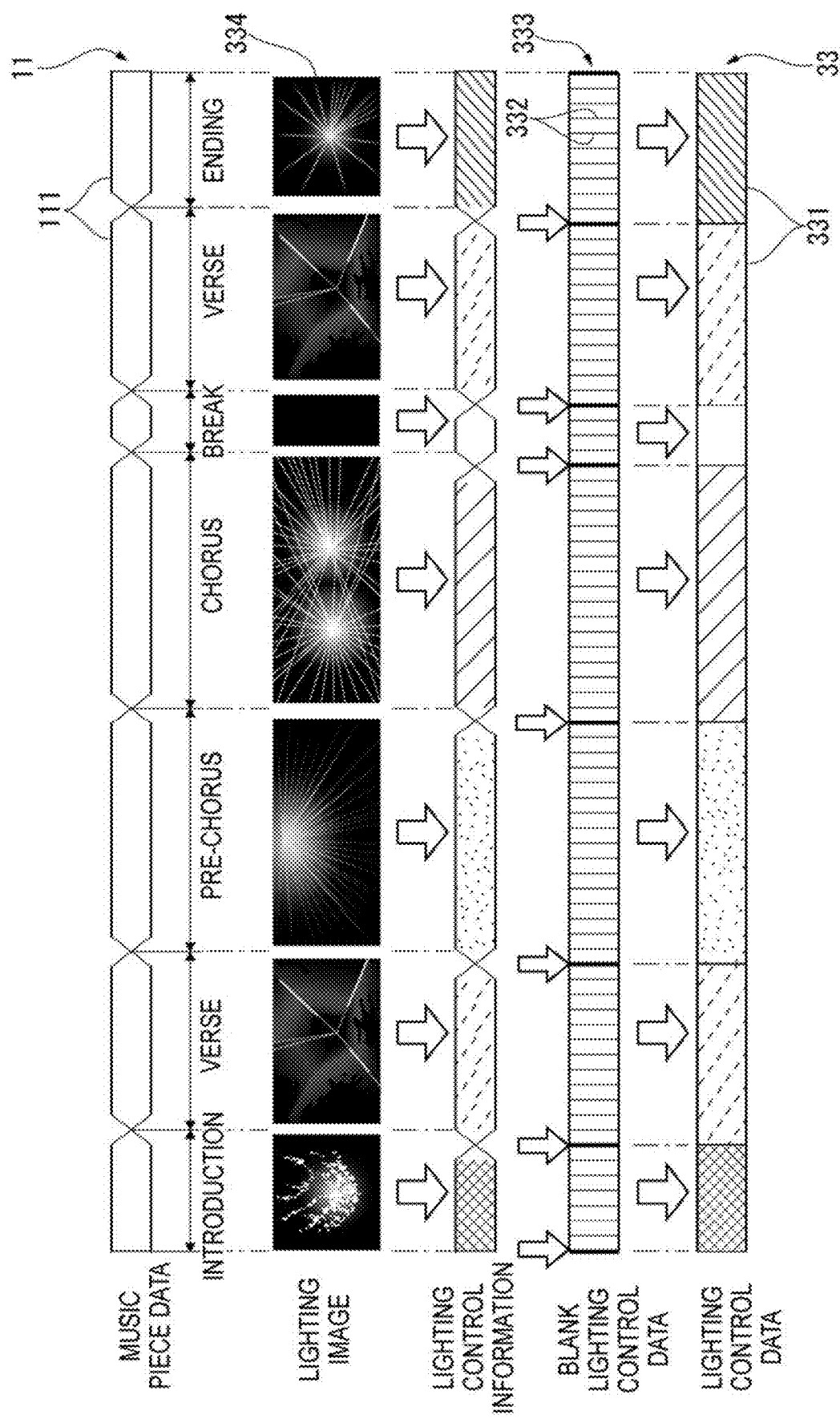

FIG. 5

| OPERATION UNIT | LIGHTING EFFECT INFORMATION |
|---|---|
| JOG DIAL | CHANGE BEAM DIRECTION RIGHT AND LEFT WITH FORWARD AND REVERSE |
| PAD | FLASH LIGHT WITH COLOR DEPENDING ON PAD |
| ROTARY VOLUME KNOB | CHANGE INTENSITY OF BACKGROUND LIGHTING WITH CHANGE IN VOLUME |
| VOLUME SLIDER | CHANGE INTENSITY OF BACKGROUND LIGHTING WITH CHANGE IN VOLUME |
| SWITCH | CHANGE COLOR OF LIGHT DEPENDING ON RESULT OF SWITCHING |
| SELECTOR | CHANGE COLOR OF LIGHT DEPENDING ON RESULT OF SWITCHING |

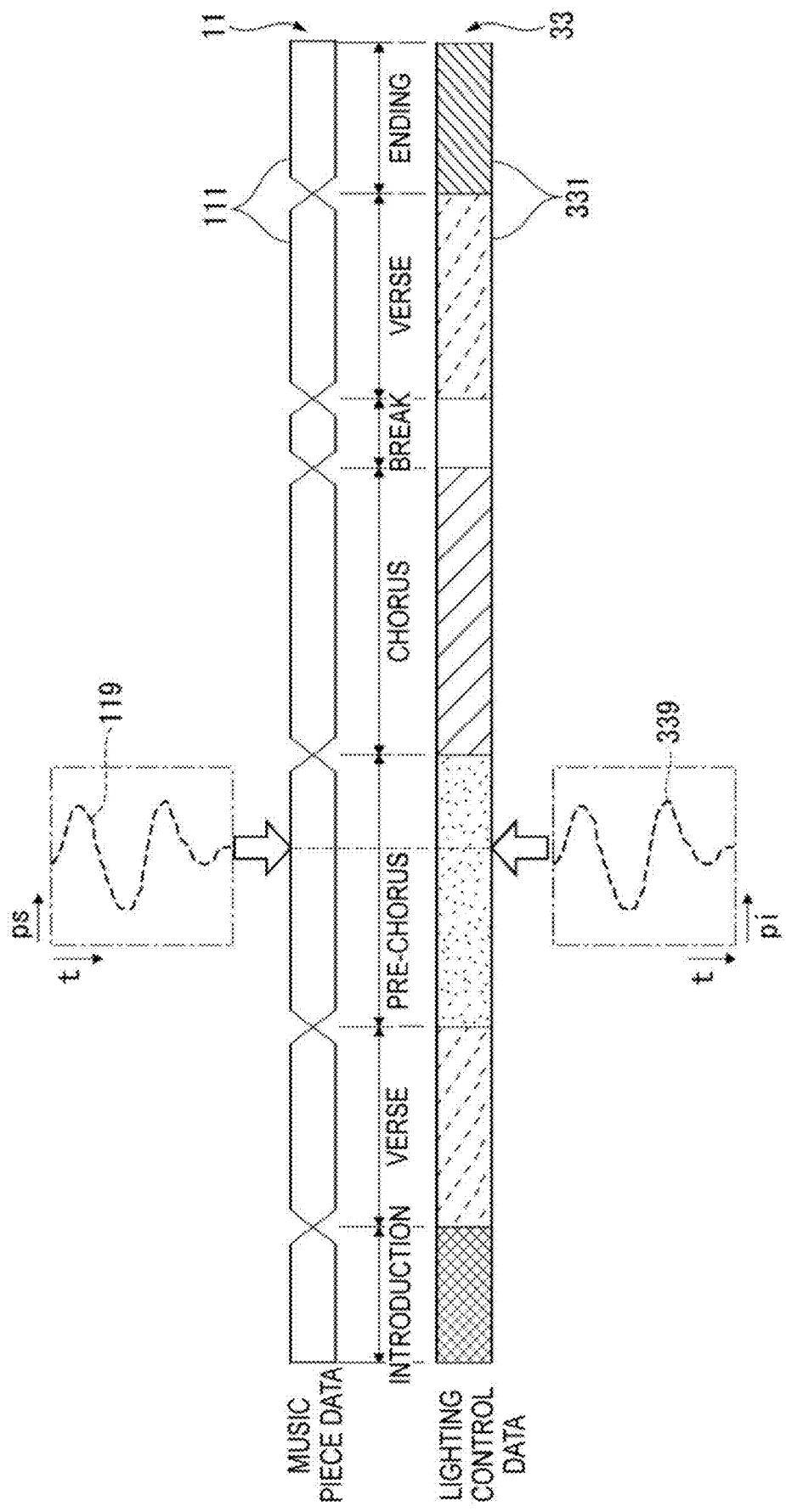

FIG. 8

| OPERATION UNIT | OPERATION CONTENT | FUNCTION GROUP | LIGHTING EFFECT INFORMATION |
|---|---|---|---|
| JOG DIAL | SCRATCH | SPECIAL REPRODUCTION | CHANGE BEAM DIRECTION RIGHT AND LEFT WITH FORWARD AND REVERSE |
| PAD 1 | ENABLE EFFECT 1 | EFFECT | FLASH LIGHT WITH COLOR DEPENDING ON PAD |
| PAD 2 | ENABLE EFFECT 2 | | |
| ROTARY VOLUME KNOB | BASS VOLUME CHANGE | VOLUME | CHANGE INTENSITY OF FLASHLIGHT DEPENDING ON VOLUME |
| VOLUME SLIDER | VOLUME CHANGE | | |

18B

ILLUMINATION CONTROL DEVICE, ILLUMINATION CONTROL METHOD AND ILLUMINATION CONTROL PROGRAM

TECHNICAL FIELD

The present invention relates to a lighting controller, a lighting control method, and a lighting control program.

BACKGROUND ART

In a concert and a night club, it is an important stage factor to match lighting with a music piece or change lighting in synchronization with a music piece.

In order to obtain an accurate stage effect by matching lighting with a music piece, a dedicated lighting staff having a good understanding of the music piece desirably manipulates a lighting device. However, it is difficult in terms of costs and the like that the dedicated staff constantly stays in a small-sized concert, night club, event and the like.

In order to overcome this difficulty, it has been attempted to automatically match lighting with a music piece. For instance, according to the technique of Patent Literature 1 or 2, lighting control data relating to lighting contents matched with the music piece is generated in advance and lighting is controlled in synchronization with the music piece based on the lighting control data during performance, thereby achieving a desired lighting matched with the music piece.

In order to generate the lighting control data, for instance, target music piece data is analyzed in advance and divided into blocks (e.g., a verse, pre-chorus, and chorus), and a lighting pattern suitable to an image of each block is associated with each block.

CITATION LIST

Patent Literature(s)

Patent Literature 1: JP Patent No. 3743079
Patent Literature 2: JP 2010-192155 A

SUMMARY OF THE INVENTION

Problem(s) to be Solved by the Invention

For the above-described lighting control of Patent Literature 1 or 2, the lighting control data corresponding to the music piece data is generated in advance. Specifically, for instance, desired lighting patterns are allocated to many blocks of the music piece on a one-to-one basis.

However, a failure in maintaining the synchronized control of the lighting corresponding to each block of the music piece causes temporal mismatch between the music piece and the lighting, so that desired stage effects cannot be obtained.

Especially, for instance, when a disc jockey (DJ) performs special reproduction, such as an operation for changing a time axis (e.g., scratch), on a music piece being reproduced in a concert and a night club, the position of elapsed time of the music piece being reproduced becomes misaligned with that of the lighting control.

Such misalignment is likely to cause the lighting to be mismatched with the music piece being reproduced later, impairing the unity of stage effects.

Accordingly, the DJ who performed the special reproduction would hastily adjust the current position of the lighting control data on site. However, it is considerably difficult to complete accurate timing setting in a short time merely by such an operation on site.

In view of the above, a technique has been demanded to maintain synchronization between reproduction of a music piece and lighting control even after special reproduction is performed.

Such a demand for maintaining synchronization between the pre-generated lighting control data and lighting control has arisen in connection with not only special reproduction as described above but also operations not programmed according to the lighting control data, such as adding effects by the DJ on site as needed and adjusting the volume.

An object of the invention is to provide a lighting controller, a lighting control method, and a lighting control program that allow for the maintenance of synchronization between reproduction of a music piece and lighting control after an unplanned operation is performed.

Means for Solving the Problem(s)

According to an aspect of the invention, a lighting controller includes: an information acquisition unit configured to obtain music piece information containing at least information on a beat position in music piece data; a lighting control unit configured to control a lighting fixture with reference to a change point of a lighting effect, whose minimum unit is defined by the beat position; and an operation interlock control unit configured to apply, in response to an operation performed on a music piece reproduction apparatus configured to reproduce the music piece data or a music piece reproduction controller configured to control the music piece reproduction apparatus, the lighting effect corresponding to the operation to the control of the lighting fixture.

According to another aspect of the invention, a lighting control method configured to be implemented with use of a computer system includes: obtaining music piece information containing at least information on a beat position in music piece data; controlling a lighting fixture with reference to a change point of a lighting effect, whose minimum unit is defined by the beat position; and applying, in response to an operation performed on a music piece reproduction apparatus configured to reproduce the music piece data or a music piece reproduction controller configured to control the music piece reproduction apparatus, the lighting effect corresponding to the operation to the control of the lighting fixture.

According to still another aspect of the invention, a lighting control program configured to enable a computer system to implement the lighting control method according to the above aspect.

BRIEF DESCRIPTION OF DRAWING(S)

FIG. 1 is a block diagram showing a configuration of an exemplary embodiment of the invention.

Figure 2:
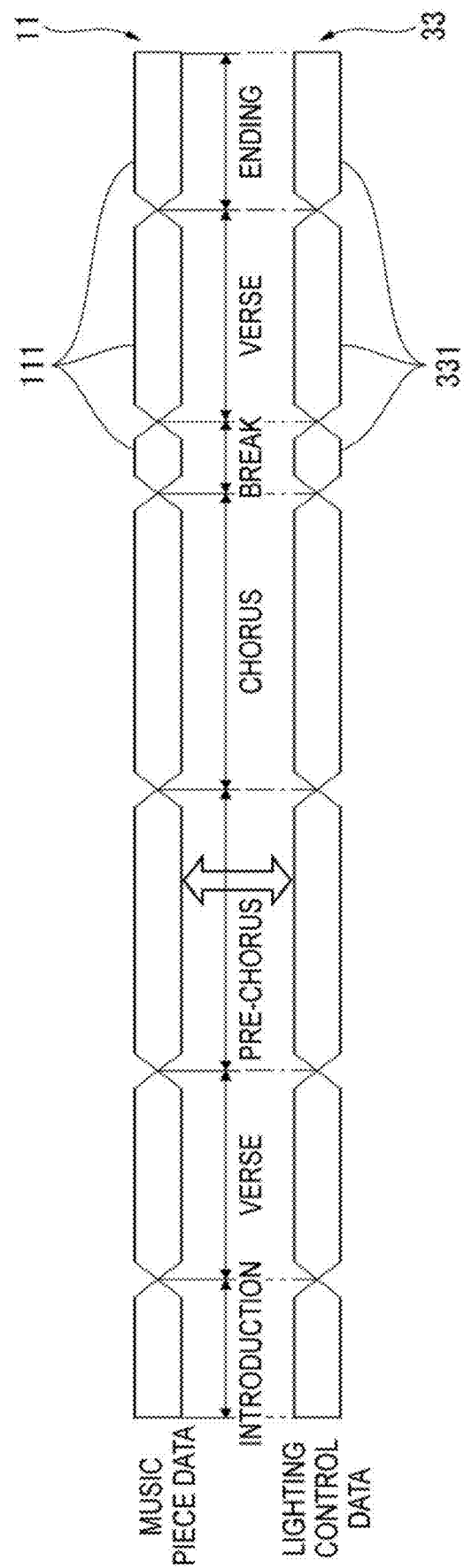

FIG. 2 schematically illustrates lighting control data corresponding to music piece data.

Figure 3:
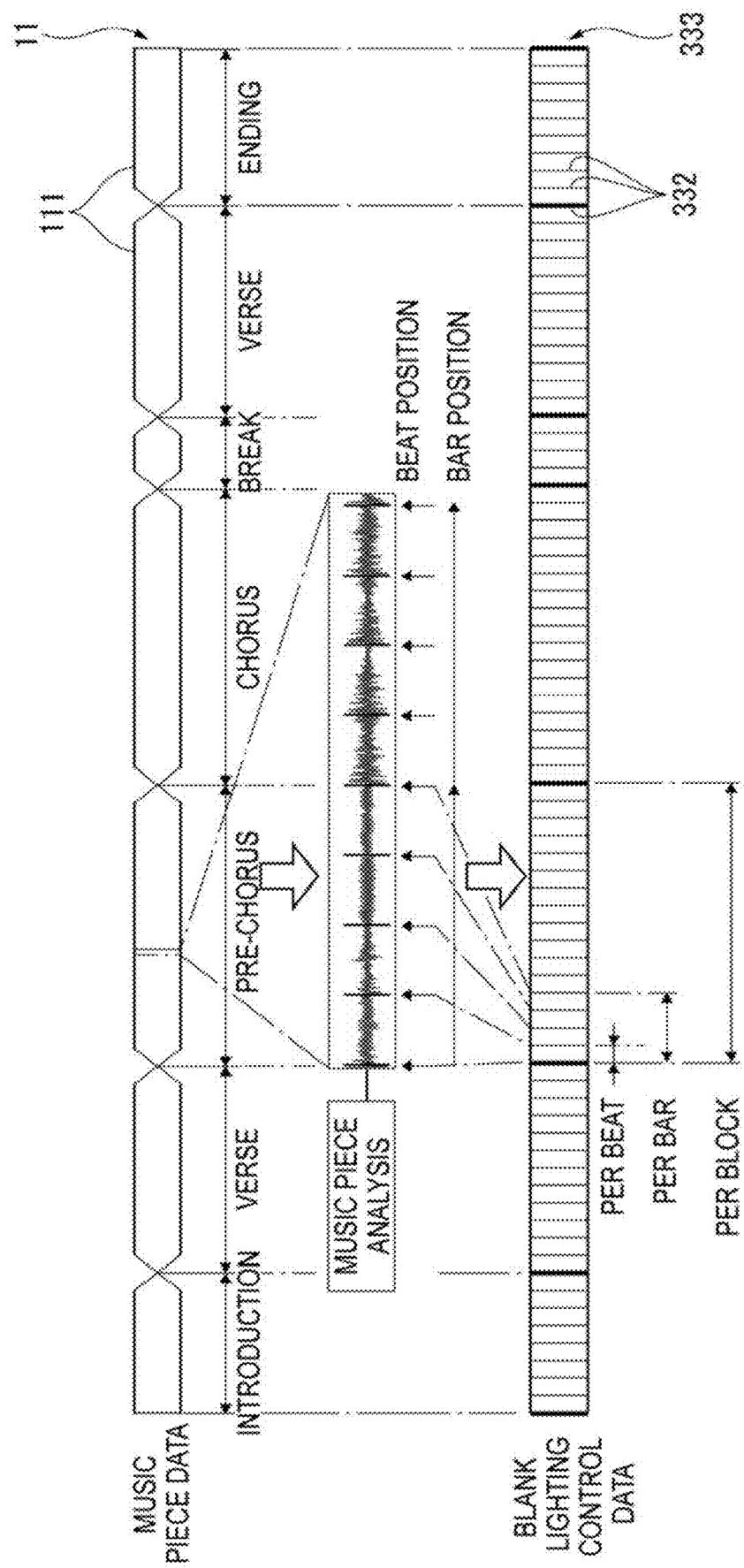

FIG. 3 schematically illustrates analysis of beat positions in a music piece and blank lighting control data.

FIG. 4 schematically illustrates a processing of allocating lighting control information to each part of the music piece.

FIG. 5 schematically illustrates lighting effect setting information corresponding to each operation unit.

FIG. 6 schematically illustrates lighting control performed in response to an operation for special reproduction.

Figure 7:

FIG. 7 schematically illustrates lighting effect setting information depending on each operation type.

FIG. 8 schematically illustrates lighting effect setting information depending on each function.

DESCRIPTION OF EMBODIMENT(S)

Exemplary embodiment(s) of the invention will be described below with reference to the attached drawings.

FIG. 1 illustrates a sound responsive lighting system 1 used at a live-performance space in a night club and the like.

The sound responsive lighting system 1 includes: a music piece reproduction apparatus 10 configured to reproduce a music piece; a lighting fixture 20 configured to provide lighting in the live-performance space; and a lighting controller 30 configured to control the lighting fixture 20.

The music piece reproduction apparatus 10 includes a general-purpose personal computer (PC) with a music player software and an acoustic system 13 connected to the PC. The PC includes a reproduction control unit 12, which is configured to function when the music player software runs, so that music piece data 11 stored in the PC can be sent in the form of an acoustic signal to the acoustic system 13 to reproduce music based on the music piece data 11 in the live-performance space.

The music piece data 11 can be supplied to the music piece reproduction apparatus 10 with use of, for instance, a disc or via a network communication.

The music piece reproduction apparatus 10 is not limited to a PC audio system including the above general-purpose PC and may be a dedicated disc reproduction apparatus or music piece data reproduction apparatus.

The music piece reproduction apparatus 10 is connected to a DJ controller 19 (music piece reproduction controller) used by a user, or disc jockey (DJ), to perform special reproduction (e.g., scratch) and/or an operation for effects.

The DJ controller 19 includes operation units, such as jog dial, pad, rotary volume knob, volume slider, switch, and selector, necessary for reproduction control of a music piece reproduced by the music piece reproduction apparatus 10.

Among the above operation units, the rotary volume knob and the volume slider allow for continuous change in parameters for reproducing a music piece (e.g., total volume, volume of bass, and channel allocation).

The switch and the selector allow for intermittent change (e.g., on/off of reproduction of a music piece and selection of a music piece).

The pad is used for a pad operation (e.g., addition of an effect having been assigned).

The jog dial is used for a jog operation for special reproduction (e.g., scratch) that changes the time position of the music piece data during reproduction.

It should be noted that the DJ controller 19 is not necessarily externally connected as a music piece reproduction controller to the music piece reproduction apparatus 10 but may be provided in the music piece reproduction apparatus 10.

The lighting fixture 20, which provides lighting in a live-performance space and an event space, includes various lighting devices 21 frequently used as live-performance equipment.

Examples of the lighting devices 21 include a bar light, an electronic flash, and a moving head, which are frequently used for stage lighting. For each of the lighting devices 21, parameters such as on and off of the lighting, brightness thereof, and, depending on the lighting device, an irradiation direction and a moving speed of the lighting device can be specified.

In order to control the above parameters, the lighting devices 21 of the lighting fixture 20, which comply with the DMX512 standard, are connected to each other in accordance with the DMX512 standard, and lighting control signals 22, which complies with the DMX512 standard, are sent to the lighting devices 21 to allow the lighting devices 21 to provide a desired lighting.

It should be noted that, although the DMX512 standard is a common standard in the field of stage lighting, the lighting fixture 20 and a later-described lighting controller 30 may comply with any other standard.

The lighting controller 30 includes, for instance, a general-purpose PC or a built-in device installed with a lighting control software configured to enable the control according to the exemplary embodiment. The above-described PC for the music piece reproduction apparatus 10 may be used for the lighting controller 30 in common.

The lighting controller 30 includes an information acquisition unit 31, a lighting control information editing unit 32, a lighting control unit 34, an operation interlock control unit 39 (including a lighting effect setting unit 38), which are configured to function when the lighting control software runs.

Among the above units, the information acquisition unit 31 and the lighting control information editing unit 32 are configured to generate lighting control data 33 corresponding to the music piece data 11.

Meanwhile, the lighting control unit 34 is configured to control the lighting fixture 20 based on the generated lighting control data 33. In the exemplary embodiment, the lighting control unit 34 is configured to function when a DMX control software runs on the PC of the lighting controller 30. The lighting control data 33 is in the form of a DMX control program to be processed by the lighting control unit 34.

The lighting control data 33 and the lighting control unit 34 each comply with the DMX512 standard of the lighting fixture 20. Thus, when lighting operations are written in the lighting control data 33 in accordance with the DMX512 standard, the lighting control unit 34 can control the lighting fixture 20 to perform a desired lighting operation.

It should be noted that the lighting control unit 34 is not necessarily configured to function when the DMX control software runs but may be provided by a hardware DMX controller connected to the PC used as the lighting controller 30. When the lighting fixture 20 complies with a standard different from the DMX standard, the lighting control unit 34 also complies with the same standard as that of the lighting fixture 20.

In the exemplary embodiment, lighting control information is allocated to each of parts of the music piece data 11 in the lighting control data 33.

As shown in FIG. 2, the music piece data 11 includes blocks 111 such as introduction, verse, pre-chorus, chorus, break, verse repetition, and ending.

Lighting control information 331 corresponding to each of the blocks 111 is set in the lighting control data 33. Specifically, respective pieces of lighting control information 331 are allocated to the introduction, the verse, the pre-chorus, the chorus, the break, the verse repetition, and the ending.

For allocating the lighting control information 331, the information acquisition unit 31 and the lighting control information editing unit 32 each perform a process per beat position in the music piece.

The information acquisition unit 31 reads the music piece data 11 from the music piece reproduction apparatus 10, conducts a music piece analysis of the registered sound data to detect the beat positions and tempos of the music piece, and registers the detected beat positions and tempos as music piece analysis information. In the music piece analysis information, each of the beat positions can be registered as a temporal position on the music piece data 11.

Further, the information acquisition unit 31 may distinguish a drum sound and a snare sound and, for instance, detect the drum sound at $1^{st}$ and $3^{rd}$ beat positions and the snare sound at $2^{nd}$ and $4^{th}$ beat positions, thereby detecting bar positions. Moreover, the information acquisition unit 31 may analyze keys and chords of the music piece and, for instance, detect a distribution of phrases, thereby detecting a block (e.g., a verse, pre-chorus and chorus) consisting of a plurality of bars.

A technology of conducting such a music piece analysis is exemplified by the technology disclosed in the patent publication JP 2010-97084 A.

The lighting control information editing unit 32 is configured to generate the lighting control data 33 to be sent to the lighting control unit 34. For data creation, the lighting control information editing unit 32 plots a plurality of reference positions for allocating the lighting control information based on the beat positions in the music piece analysis information obtained by the information acquisition unit 31.

As shown in FIG. 3, for instance, blank lighting control data 333 having a length corresponding to a length of the music piece data 11 is generated in advance and reference positions 332 are registered at respective temporal positions, which correspond one-to-one to the beat positions, in the blank lighting control data 333. As a result, the blank lighting control data 333 having the length corresponding to the length of the music piece data 11 and being divided into small sections defined by the reference positions 332 (there are many) can be obtained.

The lighting control information editing unit 32 edits the blank lighting control data 333 sectioned by the reference positions 332 to allocate the lighting control information 331 (see FIG. 2) to each of the target parts of the blank lighting control data.

As shown in FIG. 4, for instance, a DJ (user) determines a lighting image 334 based on an image of each of the blocks 111 of the music piece data 11. The lighting control information 331, which specifically represents the lighting image 334, is allocated to the blank lighting control data 333.

The lighting control information 331 includes information specifying the above lighting devices 21 in the lighting fixture 20 and specifying the parameters for each of the lighting devices 21, such as On/Off of the lighting, brightness thereof, and, depending on the lighting device, an irradiation direction and a moving speed of the lighting device.

The user may define the lighting control information 331 each time when specifying the above factors. Alternatively, at least one lighting control information set with high versatility may be preset in the lighting control information editing unit 32 in advance so that the user can select the information set as the lighting control information 331.

Still alternatively, sets of lighting control information may be combined in advance to generate a lighting pattern that evokes a predetermined image, which includes a simple image (e.g., "dark", "bright", "red" and "blue") and an emotional image (e.g., "lively", "cheerful", "lonely", "sad", and "frightening").

In allocating the lighting control information 331, for instance, the blank lighting control data 333 is displayed on the screen of the PC in the form of a bar graph with the reference positions 332 shown as a grid. The user can thus roughly allocate the lighting control information 331 to a position of each of target sections defined by the grid on the screen using, for instance, a keyboard and/or a pointing device (e.g., touchpad) connected to the PC.

Although the lighting control information 331 would be roughly allocated, the lighting control information editing unit 32 repositions the lighting control information 331 to be fitted to the closest one of the reference positions 332.

Specifically, as shown in FIG. 4, the lighting control information editing unit 32 registers the lighting control information 331 on the blank lighting control data 333 with reference to the reference positions 332. In other words, a start position of the set lighting control information 331 is forced to be positionally adjusted (so-called sucked) to the nearest one of the reference positions 332.

For instance, when a lighting control information set A is set at a verse part of a music piece, the lighting control information editing unit 32 embeds the lighting control information 331 corresponding to the lighting control information set A into a part of the lighting control data 33 corresponding to the verse part.

The lighting control information editing unit 32 thus generates the lighting control data 33 containing the pieces of lighting control information 331 allocated to be neatly fitted to the respective reference positions 332.

It should be noted that the start position of the lighting control information 331 in the lighting control data 33 may be deliberately misaligned from the closest one of the reference positions 332. Specifically, the value representing the temporal position of the lighting control information 331 allocated in the lighting control data 33 may be changed to a value representing a position different from the corresponding one of the reference positions 332 by a user's operation. Alternatively, the user may perform an operation for changing the start position of the lighting control information 331 shown on the screen to a desired position on the lighting control data 33, thereby changing the temporal position.

The lighting control data 33, in which the lighting control information 331 is allocated by the lighting control information editing unit 32, is referred to by the lighting control unit 34.

The lighting control unit 34 controls the lighting fixture 20 based on the generated lighting control data 33 as described above.

The lighting control unit 34 usually controls the lighting fixture 20 by processing the lighting control data 33 in synchronization with an operation of the reproduction control unit 12 of the music piece reproduction apparatus 10 for processing the music piece data 11 to reproduce it, thus achieving a desired lighting.

Here, when the DJ (user) uses the DJ controller 19 to perform an operation related to reproducing a music piece, especially, special reproduction (e.g., scratch), or an operation related to a time axis, the control of the lighting fixture 20 by the lighting control unit 34 is changed accordingly.

Thus, the lighting control unit 34 is connected to the operation interlock control unit 39, which includes the lighting effect setting unit 38, and the operation interlock control unit 39 is configured to receive an operation signal from the DJ controller 19.

It should be noted that the operation interlock control unit 39 is not necessarily directly connected to the DJ controller 19 and may be configured such that an operation signal having been inputted to the music piece reproduction apparatus 10 from the DJ controller 19 is transferred to the operation interlock control unit 39.

The operation interlock control unit 39 may obtain, instead of an operation signal from the DJ controller 19, a displacement of the current reproduction position or a variation in reproduction speed provided to the reproduction control unit 12 as a result of operating the DJ controller 19.

The operation interlock control unit 39 monitors an operation signal from the DJ controller 19 and detects, in response to an operation on the operation unit(s) (e.g., jog dial) of the DJ controller 19, an operation content (e.g., scratch) related thereto. The lighting effect setting unit 38 then obtains lighting effect information corresponding to the detected operation content based on preset lighting effect setting information 18 and sends the lighting effect information to the lighting control unit 34.

In the lighting effect setting information 18, correspondence is set between each of the operation units of the DJ controller 19 (e.g., jog dial, pad, rotary volume knob, volume slider, switch, and selector) and "lighting effect information" defining a lighting effect resulting from an operation on the "operation unit" as shown in FIG. 5.

For instance, "change the beam direction right and left with forwarding and reversing" (lighting effect information) is set in connection with the "jog dial" (operation unit).

Thus, when the operation interlock control unit 39 detects the operation (e.g., scratch) on the jog dial of the DJ controller 19, the lighting effect setting unit 38 selects the lighting effect information of "change the beam direction right and left with forwarding and reversing" and sends the information to the lighting control unit 34.

Pieces of such lighting effect information may be set as the lighting effect setting information 18 in the lighting effect setting unit 38 in advance by a DJ or a manufacturer of the lighting controller 30.

Further, when the operation content is related to reproduction of the music piece data 11 and intended to change the current reproduction position back and forth and change the reproduction speed, the operation interlock control unit 39 transfers this operation content, which is categorized as special reproduction requiring an operation on the time axis, to the lighting control unit 34. Consequently, a similar operation (an operation for changing the reproduction position back and forth and changing the reproduction speed) is added in processing the lighting control data 33 by the lighting control unit 34.

As shown in FIG. 1, when the reproduction control unit 12 of the music piece reproduction apparatus 10 normally reproduces the music piece data 11 (reproduction at a predetermined constant speed), the lighting control unit 34 of the lighting controller 30 processes the lighting control data 33 at a normal constant speed so that the lighting fixture 20 achieves lighting matched with the music piece.

In a normal reproduction state, the music piece data 11 reproduced by the music piece reproduction apparatus 10 is synchronized with the lighting control data 33 processed by the lighting control unit 34 as shown in FIG. 6. Specifically, a current reproduction position ps in the music piece data 11 for the music piece reproduction apparatus 10 and a current processing position pi in the lighting control data 33 for the lighting control unit 34 are matched with each other and shift at the same speed.

Here, referring to FIG. 1, assume that the DJ controller 19 is operated such that the current reproduction position ps in the music piece data 11 is moved back and forth and/or the reproduction speed is changed for special reproduction.

For instance, referring to FIG. 6, assume that the current reproduction position ps in the music piece data 11 is moved back and forth, forming an operation trajectory 119 as time t elapses.

In such a state, if the processing of the lighting control data 33 by the lighting control unit 34 progresses as before, the reproduction of the music piece data 11 will become unsynchronized with the processing of lighting control data 33.

Accordingly, the operation interlock control unit 39 monitors an operation signal from the DJ controller 19 and, in response to an operation on the DJ controller 19, moves the current processing position pi in the lighting control data 33 for the lighting control unit 34 back and forth and/or change the processing speed.

For instance, referring to FIG. 6, when the current reproduction position ps in the music piece data 11 is moved back and forth as shown by the operation trajectory 119, the current processing position pi is similarly moved as shown by an operation trajectory 339 in processing the lighting control data 33.

This allows for constantly maintaining correspondence between the current reproduction position ps in the music piece data 11 and the current processing position pi in the lighting control data 33 even when the special reproduction is performed using the DJ controller 19.

Specifically, the operation interlock control unit 39 allows a change resulting from an operation for the reproduction of the music piece data 11 to be applied to the control of lighting based on the lighting control data 33, thus always synchronizing the music piece data 11 with the lighting control data 33.

It should be understood that the scope of the invention is not limited to the above-described exemplary embodiment but includes any modifications and the like compatible with the invention.

As shown in FIG. 5, the exemplary embodiment uses the lighting effect setting information 18 containing the different pieces of lighting effect information set in connection with the respective operation units. However, as shown in FIG. 7, some exemplary embodiments use lighting effect setting information 18A containing different pieces of lighting effect information set in connection with the respective operation types of the operation units. Alternatively, as shown in FIG. 8, some exemplary embodiments use lighting effect setting information 18B containing different pieces of lighting effect information set in connection with the respective functions of units being operated.

Referring to FIG. 7, the lighting effect setting information 18A indicates correspondence of each of the operation units (e.g., jog dial) of the DJ controller 19, an "operation type" of the operation unit, and "lighting effect information", which defines a lighting effect, corresponding to the operation type.

For instance, "scratch" is to be performed on the "jog dial" (operation unit). For "scratch", "change the beam direction right and left with forwarding and reversing" (lighting effect information) is set.

Thus, when the operation interlock control unit 39 detects "scratch" performed on the jog dial of the DJ controller 19, the lighting effect setting unit 38 selects the lighting effect information of "change the beam direction right and left with forwarding and reversing" and sends the information to the lighting control unit 34.

Referring to FIG. 8, the lighting effect setting information 18B indicates correspondence of each of the operation units (e.g., jog dial) of the DJ controller 19, an "operation type" of the operation unit, a "function group" to which the operation type belongs, and "lighting effect information", which defines a lighting effect, corresponding to the "function group".

For instance, "scratch" is to be performed on the "jog dial" (operation unit). The "scratch" belongs to "special reproduction" (function group). For "special reproduction", "change the beam direction right and left with forwarding and reversing" (lighting effect information) is set.

Thus, when the operation interlock control unit 39 detects "scratch" performed on the jog dial of the DJ controller 19, the lighting effect setting unit 38 selects the lighting effect information of "change the beam direction right and left with forwarding and reversing" and sends the information to the lighting control unit 34.

Although the music piece reproduction apparatus 10 is a PC audio system in the above exemplary embodiment, the music piece reproduction apparatus 10 is a dedicated disc reproduction apparatus or music piece data reproduction apparatus in some exemplary embodiments. Further, instead of the music piece reproduction apparatus 10 being externally connected to the DJ controller 19 (i.e., separate music piece reproduction controller), the music piece reproduction apparatus 10 is a music piece reproduction apparatus including therein a DJ controller for DJ operation in some exemplary embodiments. In the latter case, the lighting controller 30 is configured to detect an operation performed on the operation unit provided to the music piece reproduction apparatus 10.

Further, the lighting controller 30 and the music piece reproduction apparatus 10 are integral with each other in some exemplary embodiments. For instance, in the above exemplary embodiment, the software allowing a PC to function as the lighting controller 30 and the software allowing a PC to function as the music piece reproduction apparatus 10 can be loaded on the same PC so that the lighting controller 30 and the music piece reproduction apparatus 10 are allowed to function on the same PC.

Further, the lighting fixture 20 and the lighting controller 30 comply with a standard different from the DMX512 standard in some exemplary embodiments.

In the above exemplary embodiment, the beat positions in the music piece analysis information are detected as the reference positions in the music piece, which are referred to for allocating the lighting control information. However, in some exemplary embodiments, instead of or in addition to allocating the lighting control information with reference to a length defined per unit of beat position, the lighting control information is set per unit defined by bars obtained as the music piece analysis information or unit defined by blocks (e.g., verse, pre-chorus and chorus) each consisting of a plurality of bars.

It should be noted that, even when the bar unit or the block unit is defined as the unit for allocating the lighting control information, the reference positions may be defined with reference to the beat positions.

Although being generated by the lighting controller 30 in the above exemplary embodiment, the lighting control data 33 can be externally edited and read by the lighting controller 30 in some exemplary embodiments. In the latter case, the information acquisition unit 31 and the lighting control information editing unit 32 of the lighting controller 30 are not necessary.

The invention claimed is:

1. A lighting controller comprising a device installed with software, the device:
   obtains music piece information comprising information on a beat position in music piece data;
   controls a lighting fixture, based on a lighting control data corresponding to the music piece data to which lighting control information is allocated, with reference to a change point of a lighting effect, whose minimum unit is defined by the beat position;
   monitors an operation signal indicating an operation performed on a music piece reproduction apparatus that reproduces the music piece data or a music piece reproduction controller that controls the music piece reproduction apparatus; and
   allocates, as the lighting effect, a lighting state of the lighting fixture and a change in the lighting state to at least one operation unit of the music piece reproduction apparatus or the music piece reproduction controller,
   wherein, in response to the operation signal the device maintains correspondence between a current reproduction position in the music piece data and a current processing position in the lighting control data, and the device detects an operation content from the operation signal, obtains lighting effect information corresponding to the detected operation content, and changes the control of the lighting fixture.

2. The lighting controller according to claim wherein the lighting effect comprises one of a single or plurality of directions, beam travel speed, light intensity, color, beam form, and selection of a lighting device for at least a predetermined period.

3. The lighting controller according to claim 1, wherein the operation unit comprises one of a jog dial, a pad, a rotary volume knob, a volume slider, a switch, and a selector.

4. The lighting controller according to claim 1, wherein the operation unit is categorized based on an operation type thereof, and
the lighting effect is set depending on the operation type.

5. The lighting controller according to claim 4, wherein the operation type comprises one of a continuous changing operation with the rotary volume knob and the volume slider, an intermittent changing operation with the switch and the selector, a pad operation being performed on the pad, and a jog operation being performed on the jog dial.

6. The lighting controller according to claim 1, wherein the operation is categorized based on a function thereof on the music piece data, and
the lighting effect is set depending on the function.

7. The lighting controller according to claim 6, wherein the function comprises one of special reproduction for changing a time position during reproduction of the music piece data, effecting for adding an acoustic effect to the music piece data, and adjusting a tone or a volume of the music piece data.

8. The lighting controller according to claim 1, wherein the lighting controller is integrally provided in the music piece reproduction apparatus or the music piece reproduction controller.

9. The lighting controller according to claim 1, wherein the lighting fixture is one of include a bar light, an electronic flash, or a moving head.

10. The lighting controller according to claim 1, wherein the lighting fixture is separate from the music piece reproduction apparatus or the music piece reproduction controller.

11. A lighting control method is implemented with use of a computer system, the method comprising:
obtaining music piece information comprising t least information on a beat position in music piece data;
controlling a lighting fixture, based on a lighting control data corresponding to the music piece data to which lighting control information is allocated, with reference to a change point of a lighting effect, whose minimum unit is defined by the beat position;
monitoring an operation signal indicating an operation performed on a music piece reproduction apparatus that reproduces the music piece data or a music piece reproduction controller that controls the music piece reproduction apparatus; and
allocating, as the lighting effect, a lighting state of the lighting fixture and a change in the lighting state to at least one operation unit of the music piece reproduction apparatus or the music piece reproduction controller, wherein the method further comprises;
in response to the operation signal, maintaining correspondence between a current reproduction position in the music piece data and a current processing position in the lighting control data, and
detecting an operation content from the operation signal, obtaining lighting effect information corresponding to the detected operation content, and changings the control of the lighting fixture.

12. The lighting control method according to claim 11, wherein the lighting fixture is one of include a bar light, an electronic flash, or a moving head.

13. The lighting control method according to claim 11, wherein the lighting fixture is separate from the music piece reproduction apparatus or the music piece reproduction controller.

14. A non-transitory computer-readable medium that stores a program code that enables a computer system to implement the lighting control method according to claim 11 when read by a computer and executed.

* * * * *